(12) United States Patent
Roe et al.

(10) Patent No.: US 9,457,887 B2
(45) Date of Patent: Oct. 4, 2016

(54) SMART MATERIAL TRAILING EDGE VARIABLE CHORD MORPHING WING

(71) Applicant: Toyota Motor Engineering & Manufacturing North America, Inc., Erlanger, KY (US)

(72) Inventors: Robert W. Roe, Upper Saddle River, NJ (US); Umesh N. Gandhi, Farmington Hills, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 213 days.

(21) Appl. No.: 14/198,012

(22) Filed: Mar. 5, 2014

(65) Prior Publication Data
US 2015/0251747 A1 Sep. 10, 2015

(51) Int. Cl.
*B64C 3/44* (2006.01)
*B64C 3/54* (2006.01)

(52) U.S. Cl.
CPC . *B64C 3/44* (2013.01); *B64C 3/54* (2013.01); *B64C 2003/445* (2013.01); *B64C 2003/543* (2013.01); *Y02T 50/145* (2013.01); *Y10T 29/49* (2015.01)

(58) Field of Classification Search
CPC ..... B64C 3/44; B64C 2003/445; B64C 3/52; B64C 3/54; B64C 3/42
See application file for complete search history.

(56) References Cited

U.S. PATENT DOCUMENTS 1,653,903 A * 12/1927 Hall ......................... B64C 3/54 244/218
3,904,152 A * 9/1975 Hill .......................... B64C 3/54 244/214

(Continued)

FOREIGN PATENT DOCUMENTS

CN 101503113 8/2009

OTHER PUBLICATIONS

Corrado Maurini, Joel Pouget, Stefano Vidoli, "Distributed Piezoelectric Actuation of a Bistable Buckled Beam," Feb. 2, 2007. Accessed from http://www.lmm.jussieu.fr/~corrado/pdfs/EJMA1937_revised_Feb2007.pdf on Feb. 6, 2016.*

(Continued)

*Primary Examiner* — Tien Dinh
*Assistant Examiner* — Alexander V Giczy
(74) *Attorney, Agent, or Firm* — Christopher G. Darrow; Darrow Mustafa PC

(57) ABSTRACT

An apparatus and methods for changing the shape of a wing using a trailing edge morphing beam. One example method includes coupling a trailing edge portion comprising a morphing beam to an elastic central portion of the wing. The morphing beam comprises a first portion formed of smart material and a second portion formed of elastic material. The method further includes actuating the smart material in the first portion of the morphing beam to change the shape of the elastic central portion of the wing and the elastic material of the morphing beam. The morphing beam can be configured to hold a first position corresponding to a minimum chord-length of the wing and a second position corresponding to a maximum chord length of the wing.

18 Claims, 3 Drawing Sheets

(56) References Cited

U.S. PATENT DOCUMENTS

| | | | |
|---|---|---|---|
| 4,824,053 A * | 4/1989 | Sarh | B64C 3/54 244/218 |
| 5,150,864 A | 9/1992 | Roglin et al. | |
| 5,632,841 A * | 5/1997 | Hellbaum | B32B 37/144 156/160 |
| 6,060,811 A * | 5/2000 | Fox | H01L 41/098 310/311 |
| 6,182,929 B1 | 2/2001 | Martin et al. | |
| 6,776,580 B2 * | 8/2004 | Fink | B64C 3/44 416/155 |
| 6,803,700 B2 * | 10/2004 | Maushard | H01L 41/047 310/330 |
| 8,186,631 B2 | 5/2012 | Iannucci | |
| 2010/0243808 A1 * | 9/2010 | Sanderson | B29C 61/0625 244/123.1 |
| 2010/0303630 A1 * | 12/2010 | Gandhi | B64C 27/001 416/223 R |
| 2013/0309089 A1 * | 11/2013 | Madsen | B64C 3/185 416/1 |

OTHER PUBLICATIONS

P. Cazottes A. Fernandes, J. Pouget and M. Hafez, "Actuation of bistable buckled beams with Macro-Fiber Composites" 2008 IEEE/RSJ International Conference on Intelligent Robots and Systems, Nice, France, Sep. 22-26, 2008. Accessed from http://ieeexplore.ieee.org/stamp/stamp.jsp?arnumber=4650765, Feb. 6, 2016.*

David A. Perkins; John L. Reed, Jr. and Ernie Havens "Adaptive wing structures", Proc. SPIE 5388, Smart Structures and Materials 2004: Industrial and Commercial Applications of Smart Structures Technologies, 225 (Jul. 29, 2004); doi:10.1117/12.541650; http://dx.doi.org/10.1117/12.541650.*

A. Y. N. Sofia et al., "Shape Morphing of Aircraft Wing: Status and Challenges", Materials and Design 31, pp. 1284-1292, Jan. 2010.*

* cited by examiner

SMART MATERIAL TRAILING EDGE VARIABLE CHORD MORPHING WING

BACKGROUND

The wings, stabilizers, and other aerodynamic features of an aircraft, such as a passenger airplane or micro air vehicle, are traditionally designed with fixed shapes having specific lift and drag characteristics for an assumed set of operating conditions for the aircraft. The speed and altitude of the aircraft, maneuvers being undertaken by the aircraft, and weather and other environmental factors can greatly affect the aerodynamic efficiency and overall performance of an aerodynamic feature.

A typical flight for an aircraft can also include a variety of airflow conditions. For example, many aircraft operate in more than one type of environment or at varying speeds. These aircraft can benefit from a change in the shape of the wing or other aerodynamic feature in order to achieve optimal lift and drag characteristics given the current operating conditions. Existing wing designs used to improve lift and drag characteristics during varying flight conditions can include materials with only a limited amount of shape altering capability that further incur an undesirable weight penalty. The small changes in the shape of the wing possible with these designs are not sufficient to optimize the performance of the aircraft throughout a variety of operating environments.

SUMMARY

An apparatus and methods for constructing and changing the shape of a wing are disclosed. The wing can include a rigidly structured leading edge portion, an elastic central portion, and a trailing edge portion including a morphing beam. The morphing beam can be configured to move between two positions: a first position minimizing the chord length of the wing and a second position maximizing the chord length of the wing. The wing designs and construction methods described below allow for a large chord change without incurring major weight or reliability penalties.

One aspect of the disclosed embodiments is a wing. The wing includes a leading edge portion, a central portion, and a trailing edge portion comprising a morphing beam.

Another aspect of the disclosed embodiments is a method for constructing a wing. The method includes forming a leading edge portion of the wing from a rigid structure and forming an outer surface of a central portion of the wing from an elastic structure. The method further includes forming a trailing edge portion of the wing from a morphing beam.

Another aspect of the disclosed embodiments is a method for changing the shape of a wing. The method includes coupling a trailing edge portion comprising a morphing beam to an elastic central portion of the wing. The morphing beam includes a first portion formed of smart material and a second portion formed of elastic material. The method further includes actuating the smart material in the first portion of the morphing beam to change the shape of the elastic central portion of the wing and the elastic material of the morphing beam.

BRIEF DESCRIPTION OF THE DRAWINGS

The description herein makes reference to the accompanying drawings wherein like reference numerals refer to like parts throughout the several views, and wherein.

DETAILED DESCRIPTION

The apparatus and method examples described below are intended to enable the design of lightweight, efficient, and reliable morphing wings. Lightweight, reliable morphing wings are of great interest, especially in the aviation industry, since the ability to change the shape of the wing can improve the overall aerodynamic efficiency of wing. Typical flights require an aircraft to operate over a variety of airflow conditions, for example, at low speed during takeoff and landing and at high speed during cruise conditions. The optimal airfoil designs for these different conditions vary, so in the use of fixed wings or those with slightly modifiable aerodynamic features, compromises must be made in order to perform in each airflow condition with the same wing. The use of a variable morphing wing could reduce the need to compromise, thereby improving overall aerodynamic efficiency.

Figure 1B:
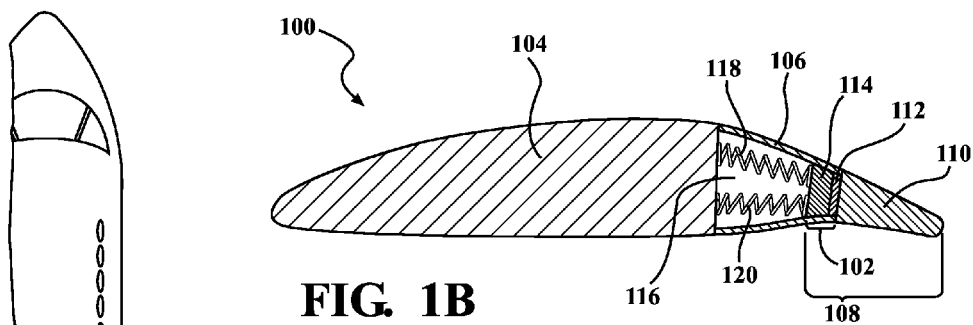
FIG. 1B is a sectional view in the chord-wise direction through the wing of FIG. 1A.
Figure 1A:
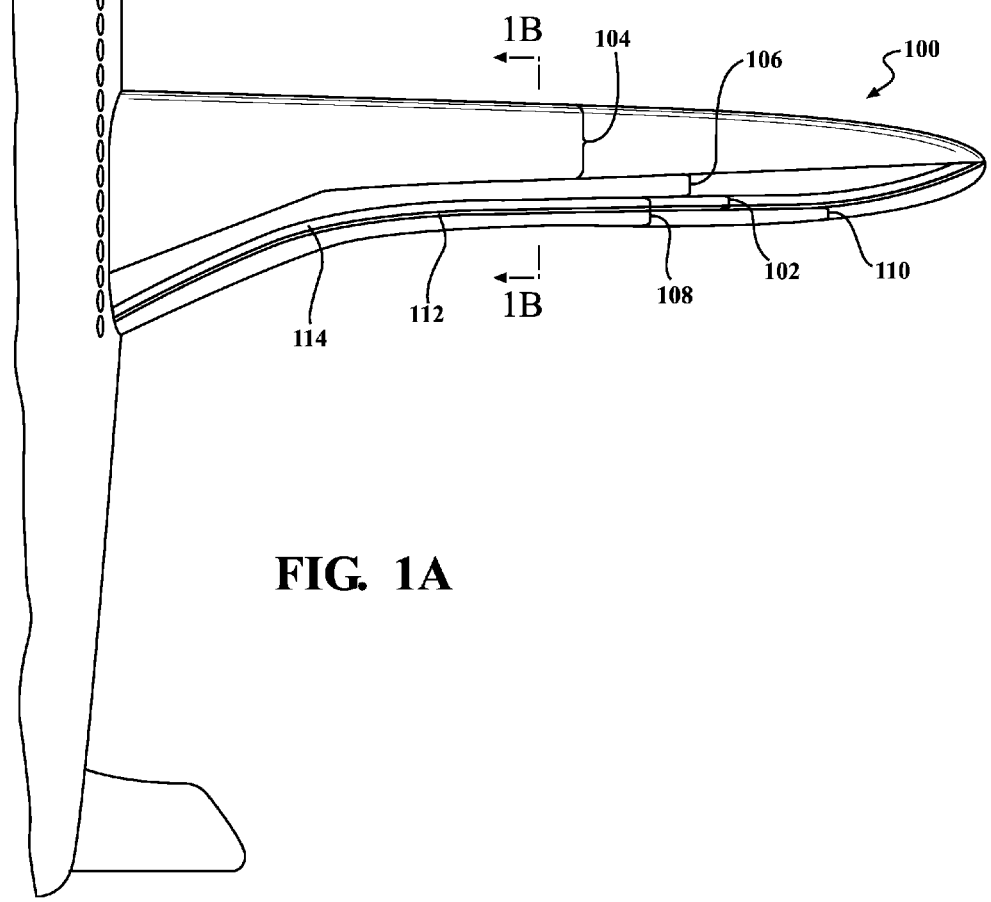
FIG. 1A is a top view of an wing including a trailing edge morphing beam in a first position.

FIG. 1A is a top view of a wing 100 including a trailing edge morphing beam 102 in a first position. The wing 100 includes several portions of different construction. The leading edge portion 104, that is, the portion of the wing 100 closest to the front of the aircraft, can include structures of sufficiently rigid construction to provide the wing enough strength and stiffness to deal with the large values of lift, down force, and drag that are experienced by the wing 100 during operation of the aircraft. Further, the leading edge portion 104 can include an outer surface that is generally smooth and shaped to optimize airflow over the remaining portions of the wing 100. Example materials used in forming the leading edge portion 104 of the wing 100 can include metals, composites, or other generally high strength materials.

The wing 100 can also include a central portion 106 extending along the length of the leading edge portion 104 and affixed to the leading edge portion 104 in a manner sufficient to allow airflow to transition smoothly between the leading edge portion 104 and the central portion 106. The central portion 106 can be formed of elastic, extensible structures and include an outer surface or skin formed, for example, of an elastomeric membrane or a structure of sliding, rigid scales. Other structures used to form the elastic material in the central portion 106 are also possible. The elastic structures used to construct the central portion 106 are intended to include any structures that allow the central portion 106 to expand and contract such that the chord of the wing 100 can vary depending on the flight conditions.

The outer surface of the central portion 106 of the wing 100 can also define an inner cavity. The inner cavity can include any manner of expandable and collapsible structure or sufficient to provide structural support to the central portion 106 of the wing 100 both in the first position shown in FIG. 1A and in other positions described below. For example, the inner cavity of the central portion 106 can include a telescoping truss to form one or more structural ribs, a comb structure forming ribs when expanded, or an accordion or spring-style structure providing strength and support both in expanded and collapsed positions. Alternatively, the inner cavity of the central portion 106 can be stiffened with the use of high-pressure air to provide structure to the wing 100, for example, when the outer surface of the central portion 106 is an elastomeric membrane. The amount of the wing 100 comprising the leading edge portion 104 and the amount comprising the central portion 106 can vary significantly depending on the design, strength, and amount of extensibility required of the central portion 106. In the example of FIG. 1A, the leading edge portion 104 comprises more than two-thirds of the wing 100 at the junction to the aircraft and one-half of the wing 100 at the wing tip.

The wing 100 can also include a trailing edge portion 108 extending along the length of the central portion 106 and affixed to the central portion 106 in a manner sufficient to allow airflow to transition smoothly between the central portion 106 and the trailing edge portion 108. The trailing edge portion 108 of the wing 100 can also include several sections of differing construction: the morphing beam 102 extending along the length of the central portion 106 and a control surface portion 110 extending along the length of the morphing beam 102. The control surface portion 110 of the trailing edge portion 108 can be formed, for example, of one or more known aerodynamic features, such as flaps or ailerons, and be designed to give the wing 100 additional morphing capabilities similar to those known in standard aircraft of generally fixed-wing configuration.

The morphing beam 102 can be configured to hold a first position corresponding to a minimum chord length of the wing 100. The first position of the morphing beam 102 is shown in FIG. 1A. The use of a shorter or minimum chord length allows for optimized operation of the aircraft in steady, cruise-type conditions of flight where the aircraft experiences high dynamic pressure and lift generally equivalent to the weight of the aircraft. The morphing beam 102 can be constructed of a first portion 112 formed of a smart material and a second portion 114 formed of an elastic material as shown in FIG. 1A. This example configuration of the morphing beam 102 is generally known as uni-morph, designed to use the smart materials in the first portion 112 to amplify the deflection of the morphing beam 102 on a single side of the elastic material in order to induce a significant amount of bending.

In the context of this disclosure, the term "smart material" can refer to any material which can be caused to expand or contract through the application of heat, electric voltage, magnetic fields, etc. Some examples of smart materials include piezoelectric composites, electro-active polymers, shape memory alloys, and carbon nanotube composites. The use of smart materials enables the design of a wing that can change chord length by a large amount without incurring major weight or reliability penalties. Additionally, having the smart material in the first portion 112 oriented in the span-wise direction, that is, oriented generally in a direction that extends from the root to the tip of the wing 100, allows for a much greater degree of actuation than designs with chord-wise oriented smart material actuation.

Though the example in FIG. 1A is shown with a single, first portion 112 of the morphing beam 102 formed of smart material, it is also possible for the morphing beam 102 to include a third portion (not shown) formed of smart material that extends the length of the elastic material in the second portion 114 on the opposite side from the first portion 112. This alternative configuration of the morphing beam 102 is generally known as bi-morph, and the use of two separate portions of smart material on opposite sides of the elastic material can allow for even further amplification of the deflection of the morphing beam 102. The use of the smart materials in the first portion 112 and optional third portion in combination with the elastic material in the second portion 114 can induce a significant amount of bending with only a limited amount of expansion and contraction at the leading and trailing surfaces of the elastic material in the second portion 114. Any bending in the trailing edge portion 108 of the wing 100 will also cause expansion or contraction in the central portion 106 of the wing, as is further described in respect to FIGS. 2A and 2B.

FIG. 1B is a sectional view in the chord-wise direction through the wing 100 of FIG. 1A. The chord-wise direction indicates an orientation generally extending from the leading edge to the trailing edge of the wing 100. In the sectional view, the leading edge portion 104, the central portion 106, and the trailing edge portion 108 are shown in additional detail. Specifically, a cavity 116 within the central portion 106 is shown, and expandable and collapsible structures 118, 120 are also shown as disposed within the cavity 116. As described above in reference to FIG. 1A, the structures 118, 120 can take many forms, such as telescoping trusses forming one or more structural ribs, comb structures forming ribs when expanded, or accordion or spring-style structures (as shown) that provide strength and support to the wing 100 both in expanded and collapsed positions. The expandable and collapsible structures 118, 120 can be used to extend between the leading edge portion 104 and trailing edge portion 108 of the wing 100 if the outer surface of the central portion 106 is formed, for example, or an elastomeric membrane. If the outer surface of the central portion 106 is alternatively formed of a rigid material, such as sliding scales, no expandable or collapsible structures 118, 120 may be necessary within the cavity 116.

Figure 2B:
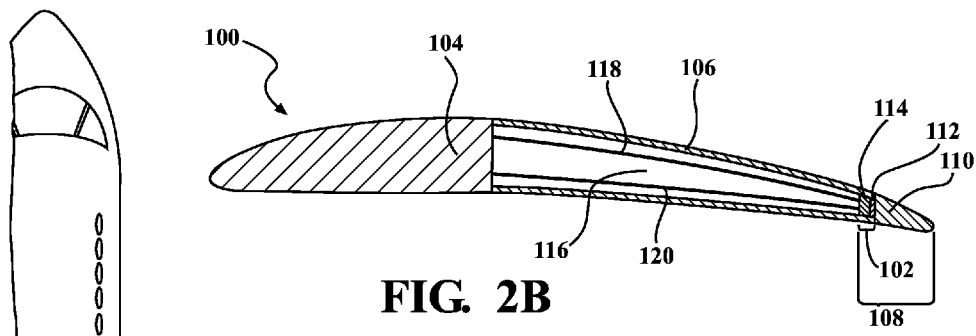
FIG. 2B is a sectional view in the chord-wise direction through the wing of FIG. 2A.
Figure 2A:
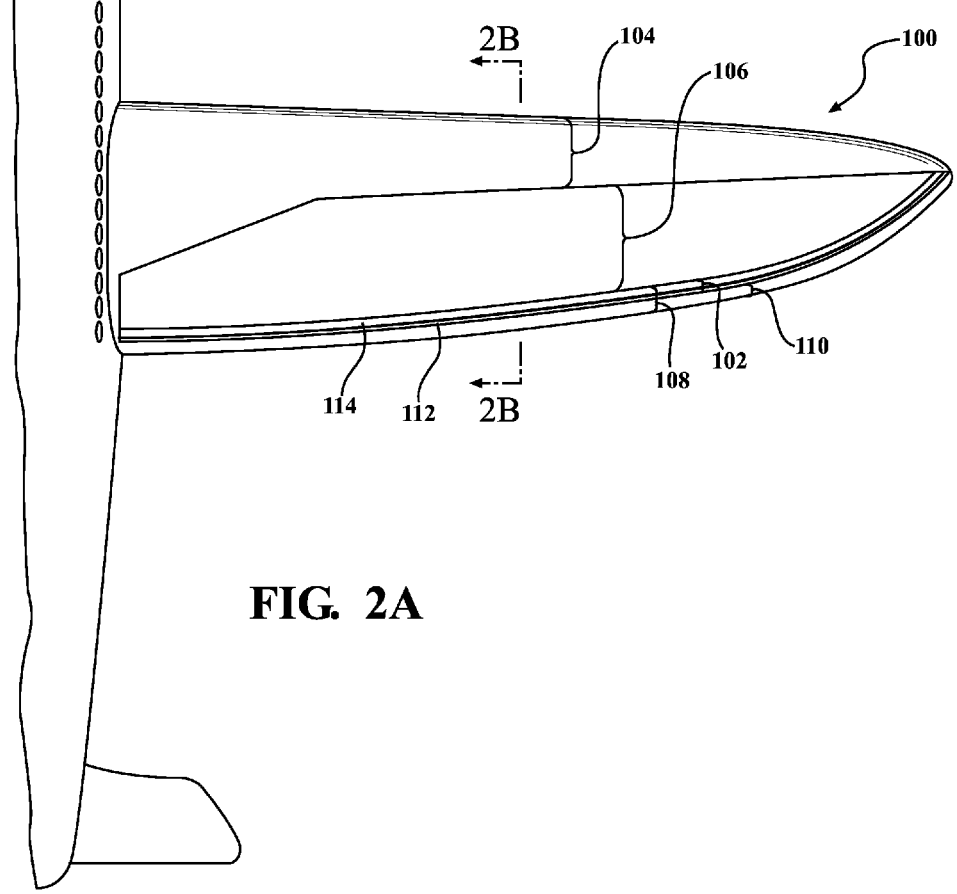
FIG. 2A is a top view of the wing of FIG. 1A with the trailing edge morphing beam in a second position.

FIG. 2A is a top view of the wing 100 of FIG. 1A with the trailing edge portion 108 and the morphing beam 102 in a second position. The second position can correspond to a maximum chord length of the wing 100. The larger overall area for the wing 100 as shown given the second position of the morphing beam 102 can be used when the aircraft is landing. That is, when the aircraft undergoes deceleration and experiences lift equal to weight at a very low dynamic pressure, a large area for the wing 100 is optimal. The second position includes a greatly expanded central portion 106 of the wing 100 with an increased distance between the leading edge portion 104 and the trailing edge portion 108 of the wing 100 as compared to the first position that was shown and described in FIGS. 1A and 1B.

The elastic material in the second portion 114 of the wing 100 is expansible, with the outer surface stretching when the smart materials in the first portion 112 of the morphing beam 102 have been actuated to place the morphing beam 102 in the second position. The morphing beam 102 can be designed to have a high bending stiffness in the camber-wise direction, that is, an orientation generally extending from the top to the bottom of the wing 100, to withstand the high values of lift and down force experienced by the wing 100 while at the same time having a low bending stiffness in the chord-wise direction of the wing 100 to allow movement between the first position and second position. These bending stiffness properties are common, for example, in anisotropic materials.

FIG. 2B is a sectional view in the chord-wise direction through the wing of FIG. 2A. FIG. 2B is similar to FIG. 1B with the difference that the trailing edge portion 108 of the wing 100 is in the second position, not the first position. The cavity 116 within the central portion 106 has been expanded, and the expandable and collapsible structures 118, 120 are shown in a fully extended position within the cavity 116. These structures 118, 120 are now in a position to provide strength and support to the central portion 106 of wing 100 in the form of ribs or trusses. In this example, the outer surface of the central portion 106 is formed of an elastomeric material, allowing the central portion 106 to stretch when the morphing beam 102 moves from the first position to the second position. Though not shown in FIG. 2B, the second position of the morphing beam 102 can be such that the morphing beam 102 is deflected out of a generally horizontal plane of the wing 100 in order to change the camber of the wing 100 from the first position.

Figure 3:
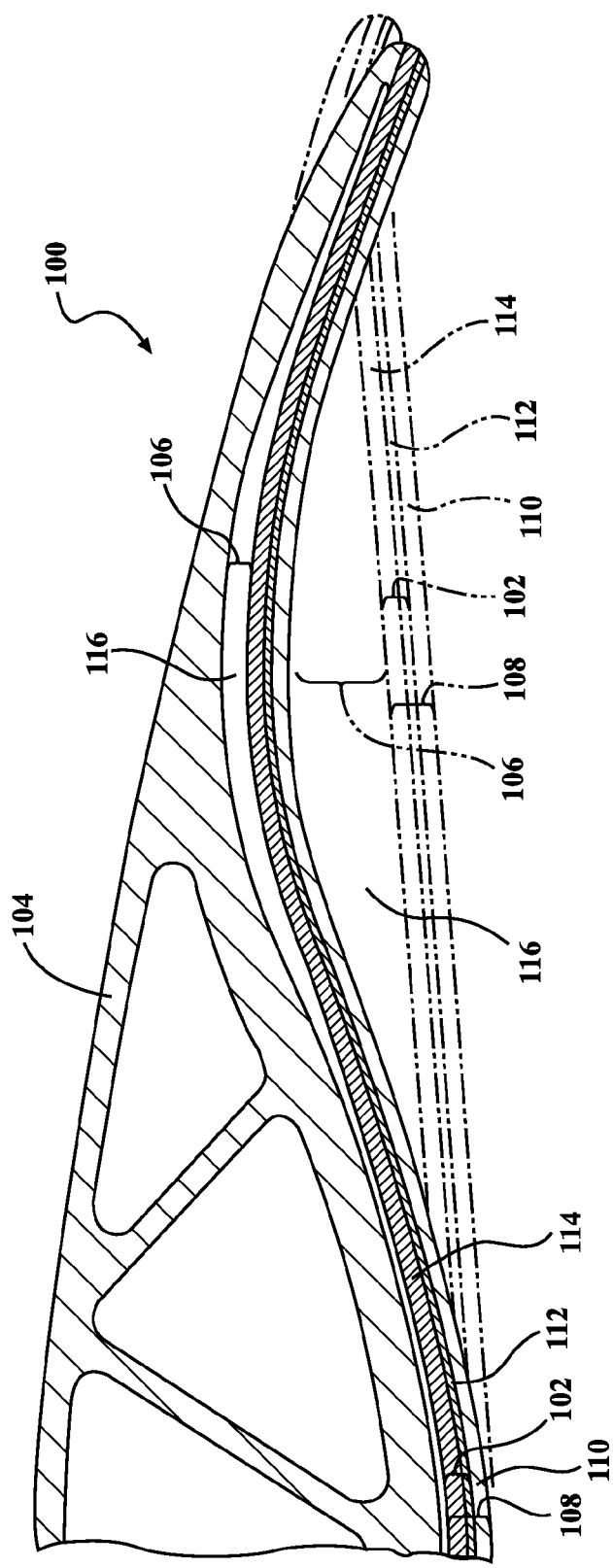
FIG. 3 is a sectional view in the span-wise direction through the wing of FIG. 1A including a dotted-line indication of a sectional view in the span-wise direction through the wing of FIG. 2A to illustrate the morphing capabilities of the wing.

FIG. 3 is a sectional view in the span-wise direction through the wing 100 of FIG. 1A including a dotted-line indication of a sectional view in the span-wise direction through the wing 100 of FIG. 2A to illustrate the morphing capabilities of the wing 100. In these sectional views, the structural supports within the leading edge portion 104 are shown in the form of trusses, though other structural features to give strength to the leading edge portion 104 are also possible. The cavity 116 within the central portion 106 is also shown with the morphing beam 102 both in the first position consistent with the solid-line sectional view and in the second position consistent with the dotted-line sectional view. The cavity 116 increases in size along the chord-wise direction of the wing 100 between the first position and the second position of the morphing beam 102.

When the morphing beam 102 moves from the first position to the second position, it is also possible for the wing tip to deflect forward, as is shown by comparing the dotted-line representation of the wing 100 in the second position to the solid line representation of the wing 100 in the first position. Actuation of the smart materials in the first portion 112 of the morphing beam 102 can be such that both the chord length of the wing 100 increases and the overall shape or area of the wing 100 is changed. That is, actuation of the smart material in the first portion 112 of the morphing beam 102 can cause changes to the shape of the elastic material in the central portion 106 of the wing, the shape of the elastic material in the second portion 114 of the morphing beam 102, and the shape of the leading edge portion.

The smart materials in the first portion 112 of the morphing beam 102 can be configured to hold two stable positions, a first position of minimum chord length and a second position of maximum chord length. Alternatively, the smart materials in the first portion 112 of the morphing beam 102 can be designed to hold multiple intermediate positions between the first position and the second position, allowing for additional chord lengths and overall shapes for the wing 100. As described above, an optional third portion of the morphing beam 102 formed of smart material can also be used, allowing for additional bending of the morphing beam 102.

Though the examples and claims herein refer to the wings of an aircraft, the morphing features can be applied to any apparatus that incorporates an airfoil shape, such as a blade in a windmill or a rotor or propeller in use with a motor. Hence, the use of the term "wing" is not meant to be limited to the context of air travel and aircraft.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wing, comprising:
   a leading edge portion;
   a trailing edge portion comprising a morphing beam extending in a span-wise direction of the wing from a wing root to a wing tip, and the morphing beam subject to having a span-wise curvature changed via bending, in a chord-wise direction of the wing, from a first stable position to a second stable position by actuation of a smart material included in the morphing beam, with the remainder of the trailing edge portion configured to conform to the morphing beam's span-wise curvature; and
   a central portion attached between the morphing beam and the leading edge portion, the central portion configured to change its shape in the chord-wise direction of the wing to accommodate changes in the morphing beam's span-wise curvature to thereby change a bottom surface area and a top surface area of the wing.

2. The wing of claim 1, wherein the leading edge portion comprises a rigid structure.

3. The wing of claim 1, wherein the central portion comprises an elastic structure that forms an outer surface of the central portion.

4. The wing of claim 3, wherein the elastic structure comprises at least one of an elastomeric membrane or a sliding scale structure.

5. The wing of claim 1, wherein the central portion defines a cavity and includes an expandable and collapsible structure disposed within the cavity.

6. The wing of claim 1, wherein the first stable position of the morphing beam corresponds to a minimum chord length of the wing.

7. The wing of claim 6, wherein the second stable position of the morphing beam corresponds to a maximum chord length of the wing.

8. The wing of claim 1, wherein the morphing beam comprises a first portion formed of the smart material and a second portion formed of elastic material.

9. The wing of claim 8, wherein the second portion is subject to bending in the chord-wise direction of the wing from the first stable position to the second stable position by actuation of the smart material in the first portion.

10. The wing of claim 8, wherein the morphing beam comprises a third portion formed of an additional smart material.

11. The wing of claim 10, wherein the second portion is sandwiched between the first portion and the third portion, and the second portion is subject to bending in the chord-wise direction of the wing from the first stable position to the second stable position by actuation of any one of the smart material in the first portion and the smart material in the third portion.

12. The wing of claim 1, wherein the leading edge portion is configured to change its shape at the wing tip responsive to actuation of the smart material in the morphing beam.

13. The wing of claim 1, wherein the trailing edge portion further comprises:
 a control surface portion extending in the span-wise direction of the wing, the control surface portion configured to conform to the morphing beam's span-wise curvature.

14. The wing of claim 13, wherein the control surface portion is located aft of the morphing beam.

15. A method for changing a span-wise curvature of a trailing edge portion of a wing, comprising:
 in a wing having a trailing edge portion including a morphing beam extending in a span-wise direction of the wing from a wing root to a wing tip, and the morphing beam subject to having a span-wise curvature changed via bending, in a chord-wise direction of the wing, from a first stable position to a second stable position by the actuation of a smart material included in the morphing beam, with the remainder of the trailing edge portion configured to conform to the morphing beam's span-wise curvature, and an elastic central portion affixed to the morphing beam and configured to change shape in the chord-wise direction of the wing to accommodate changes in the morphing beam's span-wise curvature:
 with the morphing beam in the first stable position, a step of actuating the smart material in the morphing beam to bend the morphing beam in the chord-wise direction of the wing from the first stable position to the second stable position, to thereby change the morphing beam's span-wise curvature, with the remainder of the trailing edge portion conforming to the morphing beam's span-wise curvature, change the shape of the elastic central portion of the wing to accommodate the change in the morphing beam's span-wise curvature, and change a bottom surface area and a top surface area of the wing.

16. The method of claim 15, wherein the morphing beam comprises a first portion formed of the smart material, a second portion formed of elastic material and a third portion formed of additional smart material, with the second portion sandwiched between the first portion and the third portion, and the step of actuating the smart material in the morphing beam further comprises:
 actuating the smart material in the first portion and the smart material in the second portion to bend the morphing beam in the chord-wise direction of the wing from the first stable position to the second stable position.

17. The method of claim 15, wherein the elastic central portion of the wing includes at least one of an elastomeric membrane or a sliding scale structure, and the step of actuating the smart material in the morphing beam further comprises:
 actuating the smart material in the morphing beam to bend the morphing beam in the chord-wise direction of the wing from the first stable position to the second stable position, to thereby change the shape of the at least one of the elastomeric membrane or the sliding scale structure of the elastic central portion of the wing to accommodate the change in the morphing beam's span-wise curvature.

18. The method of claim 15, wherein the elastic central portion of the wing defines a cavity and includes an expandable and collapsible structure disposed within the cavity, wherein the step of actuating the smart material in the morphing beam further comprises:
 actuating the smart material in the morphing beam to bend the morphing beam in the chord-wise direction of the wing from the first stable position to the second stable position, to thereby change the shape of the expandable and collapsible structure to accommodate the change in the morphing beam's span-wise curvature.

* * * * *